United States Patent
Tsuda et al.

[11] Patent Number: 6,124,961
[45] Date of Patent: *Sep. 26, 2000

[54] SCANNER

[75] Inventors: Naozumi Tsuda; Satoru Komada, both of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,782

[22] Filed: Sep. 24, 1997

[30] Foreign Application Priority Data

Mar. 13, 1997 [JP] Japan ................................. 9-059296

[51] Int. Cl.$^7$ ............................. G02B 26/08; G01B 9/02
[52] U.S. Cl. ........................................ 359/198; 356/345
[58] Field of Search ..................... 359/196, 199, 359/200, 198, 214; 356/109, 358, 363, 345, 346, 356

[56] References Cited

U.S. PATENT DOCUMENTS

| 3,767,307 | 10/1973 | Bowker | 356/109 |
| 4,868,385 | 9/1989 | Nishimura | 250/231.16 |
| 5,283,682 | 2/1994 | Ostaszewski | 359/214 |

*Primary Examiner*—Cassandra Spyrou
*Assistant Examiner*—Jared Treas
*Attorney, Agent, or Firm*—Armstrong, Westerman, Hattori, McLeland & Naughton

[57] ABSTRACT

A scanner scans the scan subject by means of utilizing a rotative movement of a rotatable movable member for rotatably moving on a predetermined rotation axis. A scan mirror is supported by a single support axis. A rotary power of drive motors is converted into a reciprocating motion by crank mechanisms to rotatively move the scan mirror. A rotary angle of the scan mirror is detected by utilizing a principle of an interferometer.

7 Claims, 9 Drawing Sheets

SCANNER

BACKGROUND OF THE INVENTION

1. Field of the Invention

The present invention relates to a scanner for scanning an object to be scanned utilizing a rotational movement of a rotatably movable member mounted on a predetermined rotation axis on a rotatably movable basis.

2. Description of the Related Art

Hitherto, the above-mentioned type of scanners has been used in extensive fields. For example, according to a geophysical sensor working in a satellite in low orbital flight, an image of the earth is produced by means of joining together partial images of the earth's surface by several thousands of pieces each coming once into the visual field. At that time, photography is performed in such a manner that a scan mirror, which is rotatably movable on a rotation axis in an orbit direction, sits in front of a camera, the earth surfaces are scanned by changing the scan mirror in a direction little by little in its angle with respect to the earth, and the the earth surfaces are sub-scanned by moving the scan mirror on the orbit of the satellite around the earth. Alternatively, as an example of another type of scanner other than the above-mentioned type of scanners, according to a geophysical sensor working in a stationary satellite, an image of the earth is produced by means of joining together partial images of the earth's surface by several pieces to several tens of pieces each coming once into the visual field. At that time, photography is performed on one by one image in such a manner that a scan mirror, which is rotatably movable on two rotation axes perpendicularly intersecting, sits in front of a camera, the earth surfaces are scanned by changing the scan mirror in a direction little by little in its angle with respect to the earth.

Figure 12:
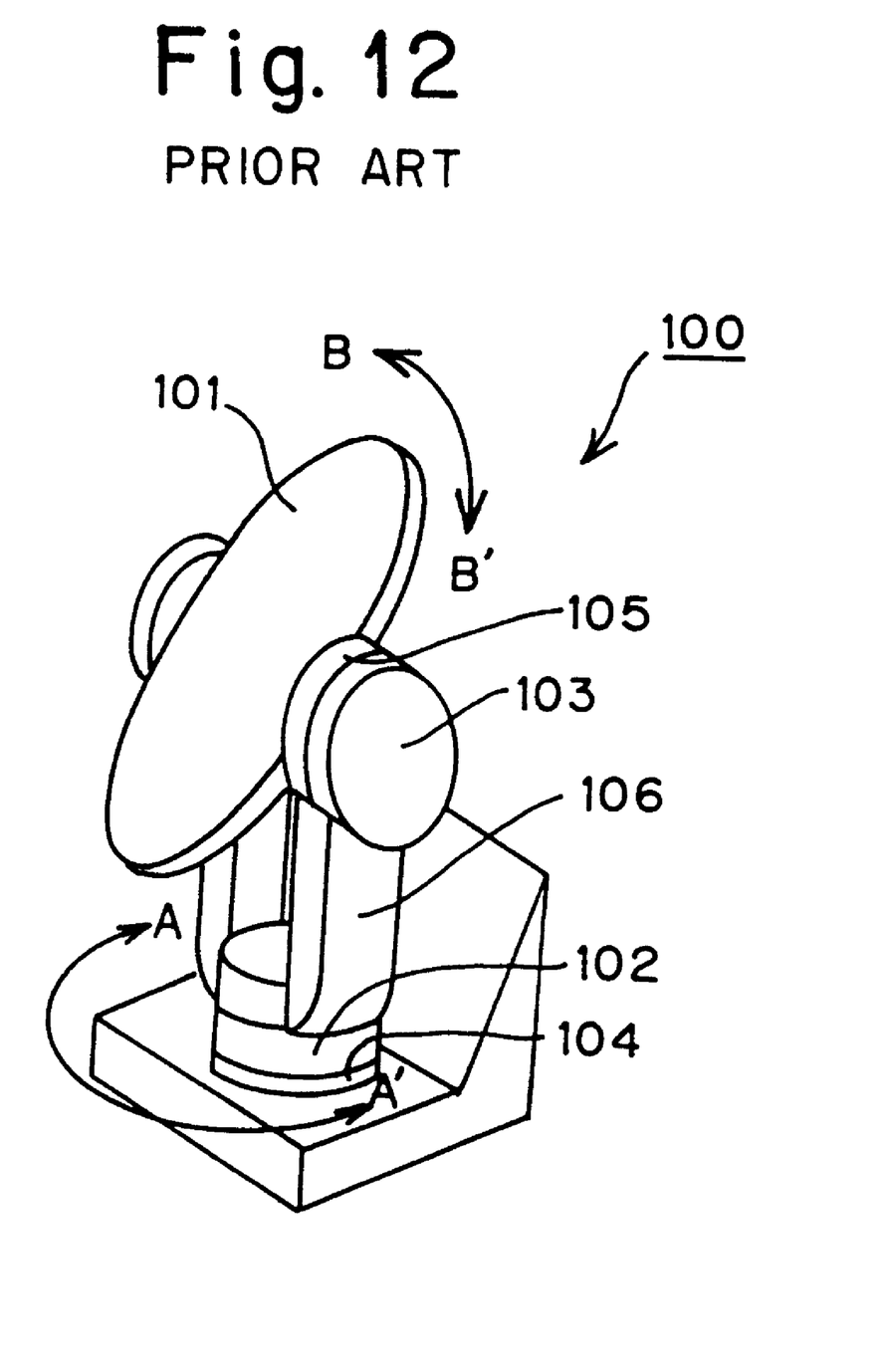
FIG. 12 is a schematic perspective view of a scan mirror scanner according to the earlier technology.

FIG. 12 is a schematic perspective view of a scan mirror scanner according to the earlier technology.

A scan mirror scanner 100 comprises an elliptical scan mirror 101, a drive motor 102 for rotatably moving the scan mirror 101 in arrow A–A' directions through a support axis 106, and a drive motor 103 for rotatably moving the scan mirror 101 in arrow B–B' directions. The drive motors 102 and 103 are provided with rotary encoders 104 and 105, respectively. The rotary encoders 104 and 105 serve to detect rotary angles in the arrow A–A' directions and the arrow B–B' directions, respectively.

The scanner 100 is loaded onto an artificial satellite. The scan mirror 101 serves to reflect individual portions of the earth, and the earth surface is scanned on a two-dimensional basis through a rotatable movement of the scan mirror 101. In this manner, photography of images of the individual portions of the earth surface is performed by a camera (not illustrated) which is set up at an image position.

According to the above-mentioned satellite in low orbital flight, while it is possible to obtain high resolution (e.g.; a resolution expressed by a unit of a radius of 50 meters of the earth surface), it is impossible to take a picture until the satellite revolves one turn to reach a place of interest in photography and thus it lacks an operability on a real-time basis such that the state of affairs can be immediately photographed. On the other hand, according to the above-mentioned stationary satellite, simply scanning of the scan lines makes it possible to photograph anywhere within the scannable range and thus it is excellent in an operability on a real-time basis. However, it is simple to obtain a low resolution (e.g. a resolution expressed by a unit of a radius of 1 kilometer of the earth surface), and thus it is simple to be utilized for obtaining weather information, for instance, concerning a large cloud as a photographic object. Consequently, it is impossible to take a picture as to a fine situation such as the state of affairs.

It is necessary for the scanner 100 to have in addition to the scan mirror 101 a support axis 106 for supporting the drive motor 103 and the rotary encoder 105. The support axis 106 is strong, big and heavy. Further, it is necessary for the drive motor 102 to support and rotatably move in addition to the scan mirror 101 the drive motor 103, the rotary encoder 105, and the support axis 106 as well. Consequently, it is necessary for the drive motor 102 to use a large sized and heavy drive motor capable of generating a large drive force. Thus, this type of scanning mirror scanner is obliged to be large and heavy in its entirety, and it is not suitable in structure for a sensor which is loaded on an artificial satellite limited in weight on board.

According to the scan mirror scanner 100, the rotary encoders 104 and 105 detect rotary angles of the scan mirror 101 in the arrow A–A' directions and the arrow B–B' directions, respectively. In general, a rotary encoder adopts a scheme such that a slit plate is provided between a light-emitting device and a light receiving element or a photo detector, and photo pulses, which are generated through a rotation of the slit plate, are counted. Accordingly, in order to enhance a resolution, there is a need to shorten slit pitches. Assuming that the radius of a slit is of 5 centimeters to obtain a resolution of 1 kilometer from 36000 kilometers in the sky, however, there is a need to provide an about 1.4 μm of slit width. This will be a limit in slit pitch in view of the problem on a practical precision. Further, while the rotary encoder is provided with slits throughout the slit plate 360° around, the rotary angle of the scan mirror is only a part of the slit plate 360° around Therefore, such an aspect that an angle can be measured throughout the slit plate 360° around is not completely effectively utilized.

SUMMARY OF THE INVENTION

In view of the foregoing, it is therefore an object of the present invention to provide a scanner capable of detecting a rotary angle of a rotatably movable member in rotatably movable range with a high resolution.

It is another object of the present invention to provide a scanner which is light in weight.

To attain the above-mentioned objects, according to the present invention, there is provided a first scanner comprising:

a rotatably movable member for rotatably moving on a predetermined rotation axis;

a rotary mechanism for causing said rotatably movable member to rotatively move on the rotation axis; and angle detection means for detecting a rotation angle of said rotatably movable member on the rotation axis, said angle detection means comprising an interference optical system for generating an interference light, and a light receiver for receiving the interference light generated by said interference optical system, wherein said interference optical system comprises a light source for emitting a coherent light, and two reflection optical members fixed in such a manner that said two reflection optical members are arranged in a direction intersecting a direction of the rotation axis so as to be placed in alignment at a regular interval, each of said reflection optical members reflecting an incident light and emitting a reflected light toward an opposite direction to an incident direction of the incident light independently of a rotary position of said rotatably movable member, and said interference optical system divides the coherent light emanated from said light source into two parts to be introduced to the respective said two reflection optical members, and superposes coherent lights reflected from said two reflection optical members each other, thereby generating the interference light caused by the coherent lights.

In the above-mentioned first scanner, it is preferable that said light receiver comprises two light receiving elements arranged in a direction in which interference fringes of the interference light on a light receiving surface of said light receiver spatially move in accordance with a rotative movement of said rotatably movable member on the rotation axis, said two light receiving elements being arranged at intervals different from pitches of the interference fringes.

Further, in the above-mentioned first scanner, it is preferable that said rotary mechanism comprises:

a motor for generating power to rotatively move said rotatably movable member; and a crank mechanism for converting a rotary motion of said motor into a reciprocating motion to transmit the power of said motor to said rotatably movable member.

To attain the above-mentioned objects, according to the present invention, there is provided a second scanner comprising:

a rotatably movable member for rotatably moving on first and second axes mutually intersecting;

first and second rotary mechanisms for causing said rotatably movable member to rotatively move on the first and second rotation axes, respectively;

first angle detection means for detecting a rotation angle of said rotatably movable member on the first rotation axis, said first angle detection means comprising a first interference optical system for generating a first interference light, and a first light receiver for receiving the first interference light generated by said first interference optical system, wherein said first interference optical system comprises a first light source for emitting a coherent light, and two first reflection optical members fixed in such a manner that said two first reflection optical members are arranged in a direction of the second rotation axis so as to be placed in alignment at a regular interval, each of said first reflection optical members reflecting an incident light and emitting a reflected light toward an opposite direction to an incident direction of the incident light independently of a rotary position of said rotatably movable member, and said first interference optical system divides the coherent light emanated from said first light source into two parts to be introduced to the respective said two first reflection optical members, and superposes coherent lights reflected from said two first reflection optical members each other, thereby generating the first interference light caused by the coherent lights; and second angle detection means for detecting a rotation angle of said rotatably movable member on the second rotation axis, said second angle detection means comprising a second interference optical system for generating a second interference light, and a second light receiver for receiving the second interference light generated by said second interference optical system, wherein said second interference optical system comprises a second light source for emitting a coherent light, said second light source being for common use with said first light source, or being provided independently, and two second reflection optical members fixed in such a manner that said two second reflection optical members are arranged in a direction of the first rotation axis so as to be placed in alignment at a regular interval, each of said second reflection optical members reflecting an incident light and emitting a reflected light toward an opposite direction to an incident direction of the incident light independently of a rotary position of said rotatably movable member, and said second interference optical system divides the coherent light emanated from said second light source into two parts to be introduced to the respective said two second reflection optical members, and superposes coherent lights reflected from said two second reflection optical members each other, thereby generating the second interference light caused by the coherent lights.

In the above-mentioned second scanner, it is preferable that said first light receiver comprises two first light receiving elements arranged in a direction in which interference fringes of the first interference light on a light receiving surface of said first light receiver spatially move in accordance with a rotative movement of said rotatably movable member on the rotation axis, said two first light receiving elements being arranged at intervals different from pitches of the interference fringes, and wherein said second light receiver comprises two second light receiving elements arranged in a direction in which interference fringes of the second interference light on a light receiving surface of said second light receiver spatially move in accordance with a rotative movement of said rotatably movable member on the rotation axis, said two second light receiving elements being arranged at intervals different from pitches of the interference fringes.

Further, in the above-mentioned second scanner, it is preferable that said first rotary mechanism comprises:

a first motor for generating power to rotatively move said rotatably movable member; and a first crank mechanism for converting a rotary motion of said first motor into a reciprocating motion to transmit the power of said first motor to said rotatably movable member, and wherein said second rotary mechanism comprises:

a second motor for generating power to rotatively move said rotatably movable member; and a second crank mechanism for converting a rotary motion of said second motor into a reciprocating motion to transmit the power of said second motor to said rotatably movable member.

Still further, in the above-mentioned second scanner, it is preferable that said two first reflection optical members are located on the second rotation axis and at places given by oppositely equal distances with respect to the first rotation axis, respectively, and wherein said two second reflection optical members are located on the first rotation axis and at places given by oppositely equal distances with respect to the second rotation axis, respectively.

BRIEF DESCRIPTION OF THE DRAWINGS

FIGS. 6(A)–(G) are views each showing a relation between a movement of a scan mirror and variations of light received signals S1 and S2;

DESCRIPTION OF THE PREFERRED EMBODIMENTS

Hereinafter, there will be described embodiments of the present invention.

Figure 1:
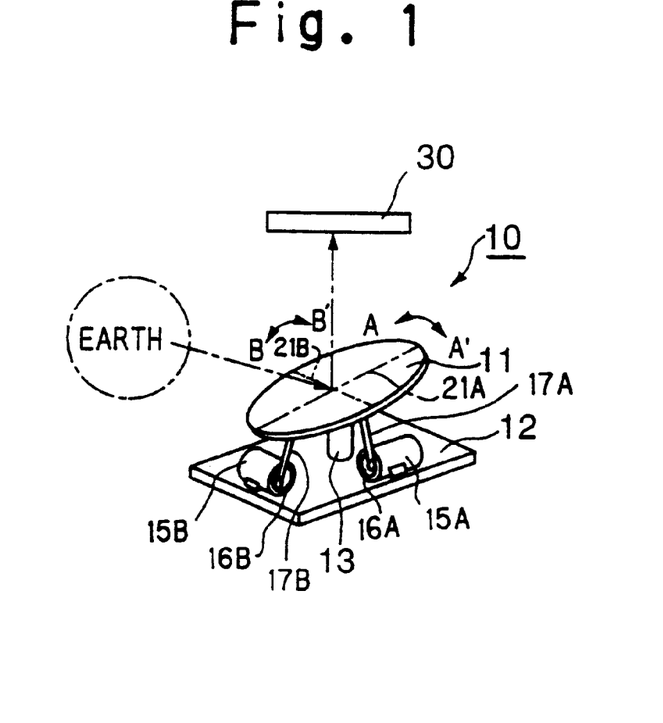
FIG. 1 is a typical perspective view of a scan mirror scanner according to an embodiment of the present invention.
Figure 2:
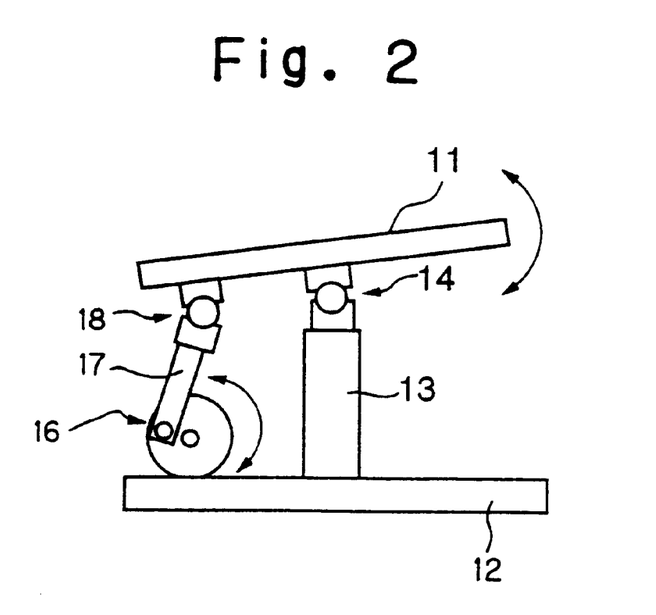
FIG. 2 is a side elevation of the scan mirror scanner shown in FIG. 1.

FIG. 1 is a typical perspective view of a scan mirror scanner according to an embodiment of the present invention. FIG. 2 is a side elevation of the scan mirror scanner shown in FIG. 1. It is noted that an angle detection mechanism for detecting a rotation angle of a scan mirror is omitted in illustration.

A scan mirror scanner 10 has an elliptical scan mirror 11 which is mounted on a support axis 13 standing on a base 12 through a two degree of freedom of universal joint 14 (cf. FIG. 2) permitting the scan mirror 11 to rotatably move on two rotation axes 21A and 21B which are perpendicularly intersect each other.

There are placed two drive motors 15A and 15B on the base 12. These two drive motors 15A and 15B and the scan mirror 11 are coupled with each other through crank mechanisms 16A and 16B each for converting rotary motions of the drive motors 15A and 15B into reciprocating motions, coupling links 17A and 17B, and universal joints 18A and 18B each of which has two degree of freedom (cf. FIG. 2), respectively. It is noted that FIG. 2 representatively shows only one of two sets of driving mechanisms to be set up, together with reference numbers in which suffixes are omitted. When the drive motors 15A and 15B rotate, the scan mirror 11 reciprocates in arrows A–A' directions and B–B' directions, respectively, so that images of the respective portions of the earth as the camera subject are introduced onto an image receiving element 30.

The scan mirror scanner 10 according to the present embodiment adopts the driving mechanisms as shown in FIGS. 1 and 2. This feature permits only the scan mirror 11 to be driven. In other words, there is no need to drive, as in the scan mirror scanner shown in FIG. 12, the entirety including not only the scan mirror 101 but also the drive motor 103 and the support axis 106, by the drive motor 102. Thus, it is possible to contribute to a weight saving and a reduction of the energy consumption.

Figure 3:
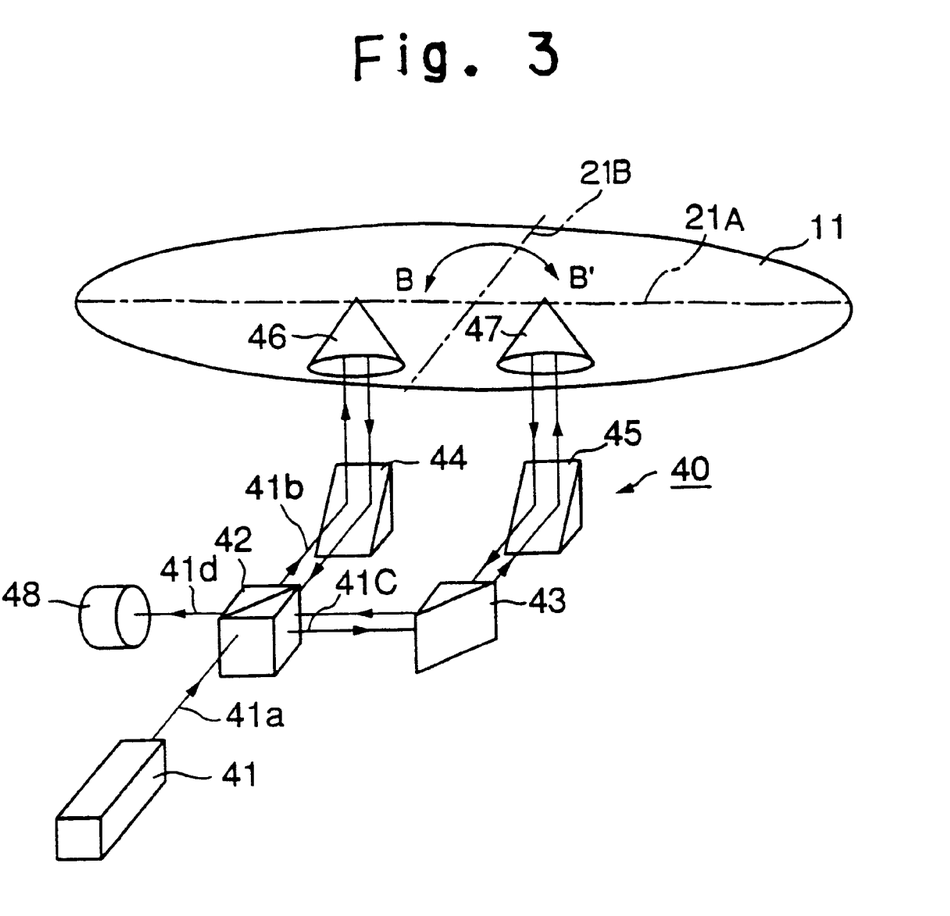
FIG. 3 is a typical perspective view of, by way of example, an angle detection mechanism of the scan mirror scanner shown in FIG. 1.

FIG. 3 is a typical perspective view of, by way of example, an angle detection mechanism of the scan mirror scanner shown in FIG. 1. It is noted that FIG. 3 representatively shows only one of two sets of angle detecting mechanisms to be set up.

An angle detecting mechanism 40 detects a rotation angle in arrow B–B' directions with respect to the rotation axis 21B. In the angle detecting mechanism 40, the tops of two corner cubes 46 and 47 are fixed on the back of the scan mirror 11 in such a manner that the tops of the corner cubes 46 and 47 are located on the rotation axis 21A and at the places given by oppositely equal distances with respect to the rotation axis 21B, respectively. Each of the corner cubes 46 and 47 comprises a combination of three reflection mirrors which are arranged in such a relation that they mutually perpendicularly intersect, and has a property that even if the scan mirror 11 rotates on any of the rotation axes 21A and 21B, the incident light is reflected and emitted toward an opposite direction to an incident direction of the incident light.

The angle detecting mechanism 40 has the above-mentioned two corner cubes 46 and 47, and is arranged as follows.

A laser beam 41a emitted from a laser beam source 41 is splitted by a beam splitter 42 into two beams, that is, a first laser beam 41b transmitted through the beam splitter 42, and a second laser beam 41c reflected by the beam splitter 42. The first laser beam 41b is reflected by a rectangular prism 44, reflected by the corner cube 46 to return to the rectangular prism 44, reflected again by the rectangular prism 44, and further reflected by the beam splitter 42. On the other hand, the second laser beam 41c is reflected by a rectangular prism 43, reflected by an additional rectangular prism 45, reflected by the corner cube 47 to return to the rectangular prism 45, reflected again by the rectangular prisms 45 and 43, and transmitted through the beam splitter 42. In this manner, the second laser beam 41c transmitted through the beam splitter 42 is superposed on the first laser beam 41b by reflected by the beam splitter 42 to generate an interference light 41d in the form of an interference of those two laser beams 41b and 41c. The interference light 41d thus generated is incident upon a light receiver 48.

Figure 4:
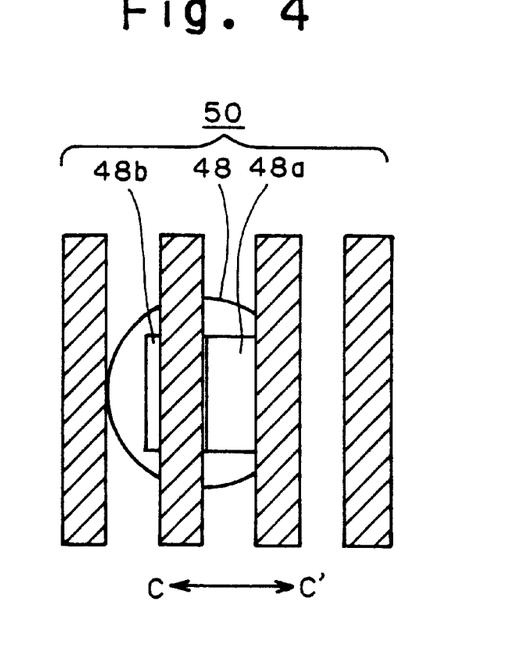
FIG. 4 is a view showing a pattern of interference fringes caused by interference light, which is formed in front of a light receiver, and a schematic structure of the light receiver.
Figure 5:
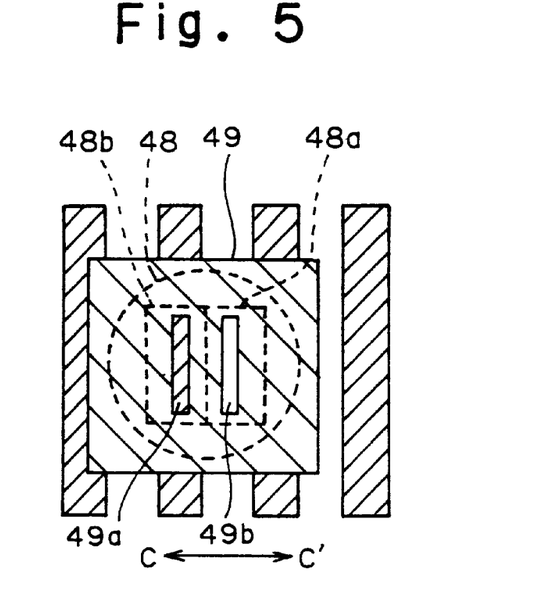
FIG. 5 is a view showing a state in which a slit plate is placed in front of a light receiver.

FIG. 4 is a view showing a pattern of interference fringes caused by the interference light 41d, which is formed in front of the light receiver 48, and a schematic structure of the light receiver 48. FIG. 5 is a view showing a state in which a slit plate 49 is placed in front of the light receiver 48.

In front of the light receiver 48, as shown in FIG. 4, there is formed an interference fringe 50 in which dark and light repeatedly appear alternatively at a predetermined pitch in the beam of the interference light 41d (cf. FIG. 3). When the scan mirror 11 shown in FIG. 3 rotates on the rotation axis 21B in the arrow B–B' directions, the interference fringe 50 move in arrow C–C' directions.

The light receiver 48 is provided with two light receiving elements 48a and 48b arranged in the arrow C–C' directions in which the interference fringe 50 move in accordance with a movement of the scan mirror 11. An interval between the light receiving elements 48a and 48b is different from the pitch of the interference fringe 50. Consequently, the light receiving elements 48a and 48b can receive the moving interference fringes in mutually different phases. As shown in FIG. 5, when a slit plate 49, which has two slits 49a and 49b at the positions associated with the arrangement positions of the two light receiving elements 48a and 48b, respectively, is placed in front of the light receiver 48, each of the light receiving elements 48a and 48b can receive only a part concerned with a more sharp in phase, of the interference fringe 50.

FIGS. 6(A)–(G) are views each showing a relation between a movement of the scan mirror 11 and variations of light received signals S1 and S2 which are obtained by the light receiving elements 48a and 48b, respectively.

Figures 6A, 6G:
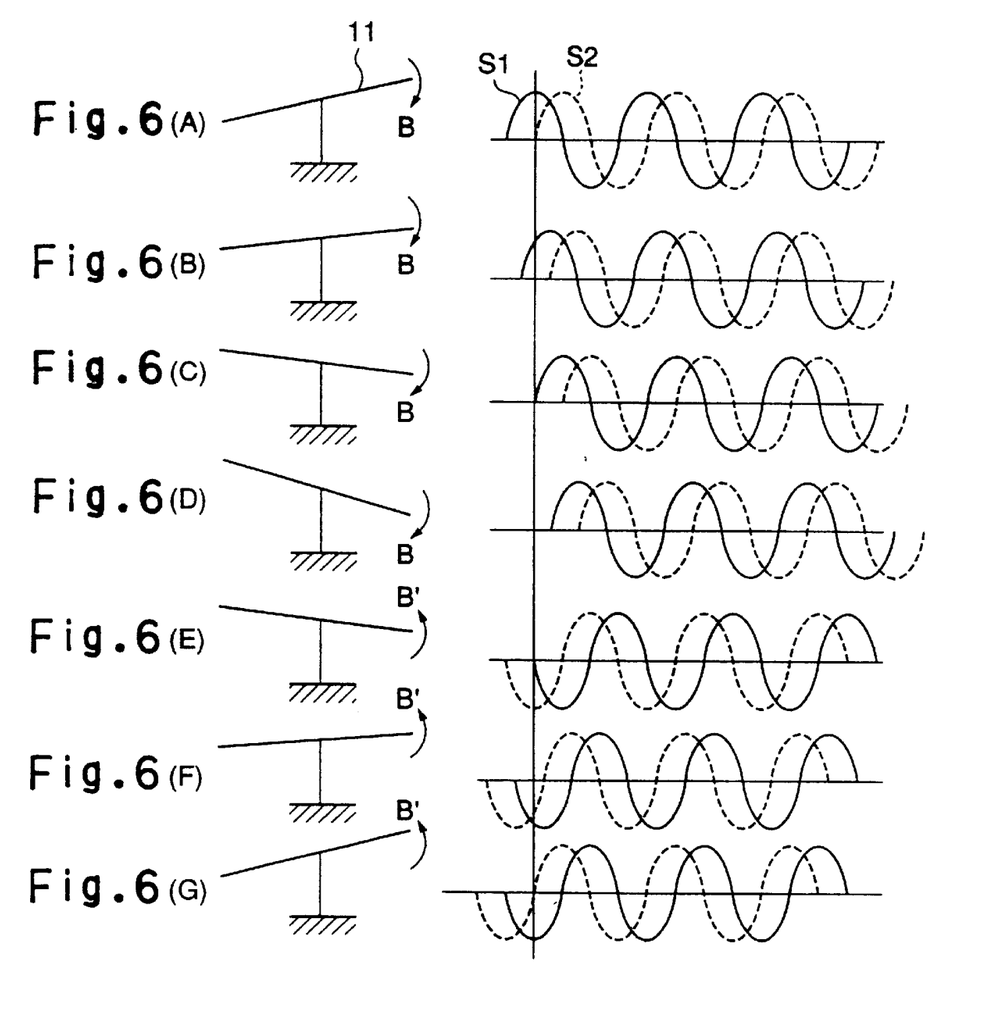

As shown in FIGS. 6(A)–(D), providing that the light received signal S2 leads the light received signal S1 in phase while the scan mirror 11 rotatably moves in an arrow B direction, when the scan mirror 11 reaches one end in movement and reverses in a movement direction to move in an arrow B' direction, as shown in FIG. 6(E), a phase relation between the light received signals S1 and S2 is reversed and then there is offered such a state that the light received signal S1 leads the light received signal S2 in phase. As shown in FIGS. 6(F)–(G), the phase relation between the light received signals S1 and S2 is maintained while the scan mirror 11 rotatably moves in an arrow B' direction. In this manner, when two light receiving elements are provided and the phase relation between two light received signals S1 and S2, which are generated from the two light receiving elements, is investigated, it is possible to identify which direction the scan mirror 11 moves in. Further, when either one or both of these two light received signals S1 and S2 are used to measure a movement of interference fringes caused by a movement of the scan mirror 11, or to count the number of repetitive pulses of light received signals obtained by either one or both of the light receiving elements, it is possible to detect a rotation angle of the scan mirror 11. Further, counting the light received signals through a multiplication makes it possible to more enhance a resolution of an angle detection in accordance with a number of multiplication, as compared with the case that the number of repetitive pulses of the light received signals is directly counted.

The origin of the angle is determined as follows.

A phase relation of the two light received signals S1 and S2 is detected, rotation angles of the scan mirror 11, which are involved in the timing of transfer of the state from FIG. 6(D) to FIG. 6(E), that is, a first timing in which the scan mirror 11 changes in a movement direction from the arrow B direction to the arrow B' direction, and a second timing in which the scan mirror 11 reversely changes in a movement direction from the arrow B' direction to the arrow B direction, respectively, are detected, and the origin of the angle is given with the middle of the angle thus detected. Thus, the rotational movement of the scan mirror 11 in the arrow B direction (plus direction) or the arrow B' direction (minus direction) with respect to the origin angle is determined. Alternatively, it is acceptable that the rotation position of the scan mirror 11 in association with the first timing, or the rotation position of the scan mirror 11 in association with the second timing, is defined as the origin of the rotation angle, and the rotation angle is expressed by a numerical value having no plus or minus signs.

Figure 7:
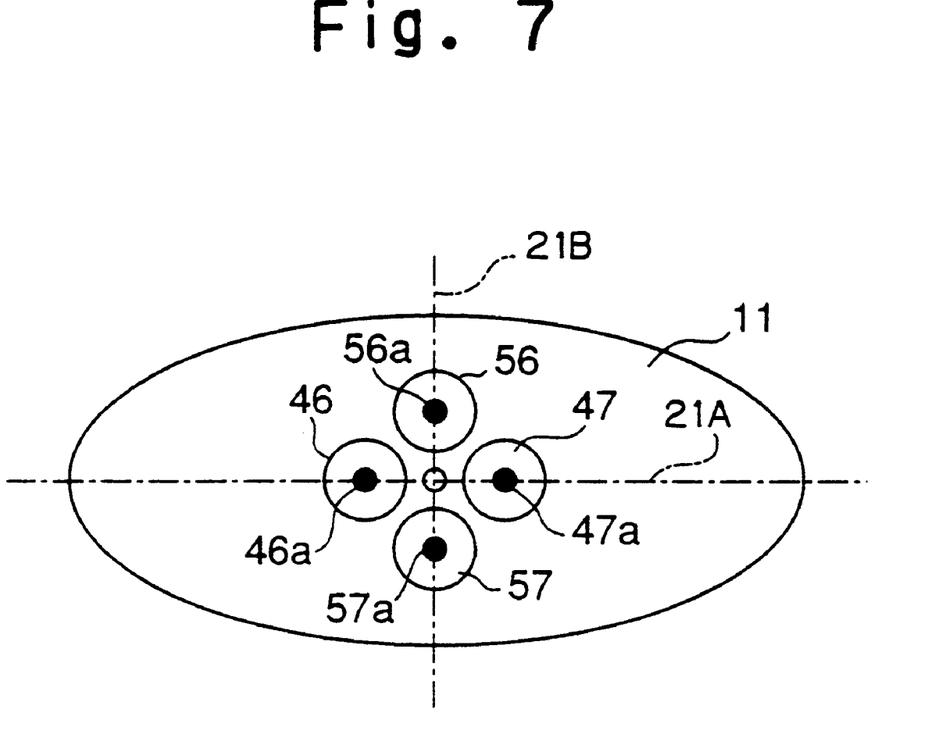
FIG. 7 is a typical illustration of fixed positions of corner cubes onto a scan mirror

FIG. 7 is a typical illustration of fixed positions of corner cubes onto the scan mirror 11.

While the above description is concerned with the angle detection mechanism for detecting a rotation angle on the rotation axis 21B of the scan mirror 11, including the two corner cubes 46 and 47, it is to be noted that the scan mirror scanner according to the present embodiment is provided with an additional angle detection mechanism similar to the above-mentioned angle detection mechanism. The second angle detection mechanism detects a rotation angle on the rotation axis 21A of the scan mirror 11, including two corner cube mirrors 56 and 57.

The two corner cubes 46 and 47, which constitute the angle detection mechanism for detecting a rotation angle on the rotation axis 21B of the scan mirror 11, are fixed on the back of the scan mirror 11 in such a manner that the tops 46a and 47a of the corner cubes 46 and 47 are located on the rotation axis 21A and at the places given by oppositely equal distances with respect to the rotation axis 21B, respectively. In a similar fashion to that of the corner cubes 46 and 47, the two corner cubes 56 and 57, which constitute the second angle detection mechanism for detecting a rotation angle on the rotation axis 21A of the scan mirror 11, are fixed on the back of the scan mirror 11 in such a manner that the tops 56a and 57a of the corner cubes 56 and 57 are located on the rotation axis 21B and at the places given by oppositely equal distances with respect to the rotation axis 21A, respectively.

When the four corner cubes 46, 47; 56, 57 are fixed on the scan mirror 11 in the position relation as mentioned above, a balance of a moment on the each of the rotation axes 21A and 21B of the scan mirror 11 is maintained. In addition, the rotation angle on the rotation axis 21B appears in its influence only on the angle detection mechanism using the corner cubes 46 and 47, and the rotation angle on the rotation axis 21A appears in its influence only on the angle detection mechanism using the corner cubes 56 and 57. In other words, the use of the respective angle detection mechanisms makes it possible to measure the rotation angle on the rotation angle on the rotation axis 21B and the rotation angle on the rotation axis 21A independently of each other.

Incidentally, it is either acceptable that the laser beam source 41 (cf. FIG. 3) is used on a common basis in those two angle detection mechanisms, or that individual laser beam sources are used for those two angle detection mechanisms, respectively. Further, it is acceptable that parts of the optical segments shown in FIG. 3 are used on a common basis in those two angle detection mechanisms.

Hereinafter, the present embodiment will be described more in detail.

It is assumed that the scan mirror is an elliptical mirror having a shape and weight shown in Table 1.

TABLE 1

| Mirror shape | Ellipse |
|---|---|
| Length | 620 mm |
| Breadth | 410 mm |
| Thickness | 12 mm |
| Weight | 7 kg |

Here, the scan mirror scanner is arranged in such a manner that the scan mirror is driven so as to satisfy a target specification shown in Table 2.

TABLE 2

| Scan angle | ±5.2 degrees |
|---|---|
| Angle control resolution | 70 μrads or below |
| Angle detection resolution | 1.4 μrads or below |
| Drive velocity | move to the adjacent scene (0.89 mrads) within a one second |

Figure 8:
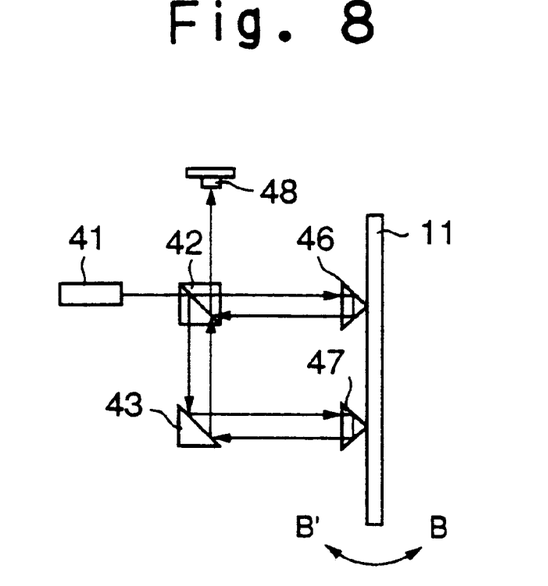
FIG. 8 is a side view of the angle detection mechanism before rotating.
Figure 9:
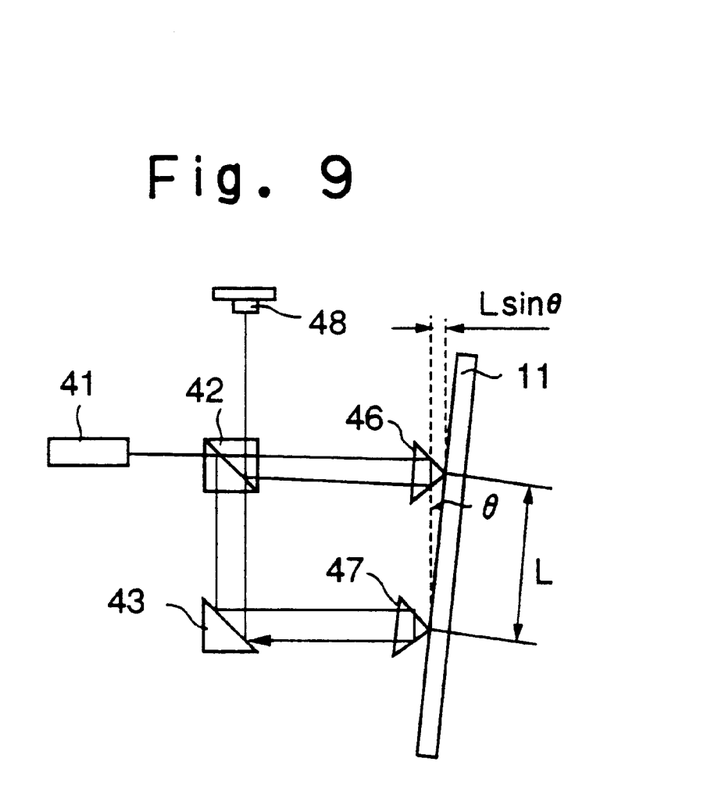
FIG. 9 is a side view of the angle detection mechanism after rotating.

FIG. 8 is a side view of the angle detection mechanism (only one) before rotating. FIG. 9 is a side view of the angle detection mechanism (only one) after rotating. In these figures, the rectangular prisms 44 and 45 are omitted in illustration.

It is now assumed that the scan mirror 11 rotates by an angle θ from the state shown in FIG. 8 and reaches the state shown in FIG. 9.

At that time, as shown in FIG. 9, a difference between two optical paths in length varies by L sin θ on each of a going path and a returning path of the laser beam, and in total by 2 L sin θ. On the light receiving element, the light portion and the dark portion are alternately repeatedly generated owing to the interference fringes, as the difference between the two optical paths in length is increased. Now providing that the counted number for the light portion is N, and the wavelength of the used laser beam is λ, the following expression is established.

$$2 \text{ L sin } \theta = N\lambda$$

Thus, the rotation angle is expressed by $$\theta = \sin^{-1}(N\lambda/2 \text{ L})$$

Since counting the number of the light portions makes it possible to detect the difference between the two optical paths in length in units of a wavelength, the resolution of the angle is expressed by $$\theta = \sin^{-1}(\lambda/2 \text{ L})$$

When two pieces of the light receiving element for detecting the interference fringes are arranged in parallel so that the phase difference between the light signal and the dark signal is about 90 degrees, it is possible to enhance the resolution from 2 to 4 times.

Table 3 shows a logical resolution of the principle of the present detection, where with respect to the wavelength λ of the light source, and the distance between the corner cubes 46 and 47, the following values are adopted.

λ=780 nm
L=150 mm

TABLE 3

| Multiplication | Angle [μrads] |
|---|---|
| 1 | 2.6 |
| 2 | 1.3 |
| 4 | 0.7 |

Figure 10A:
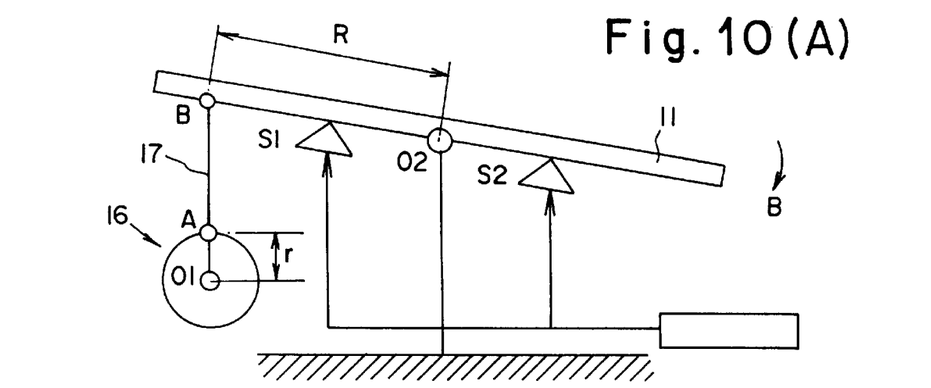
FIGS. 10(A)–(C) are typical side views each showing a crank mechanism.
Figure 10B:
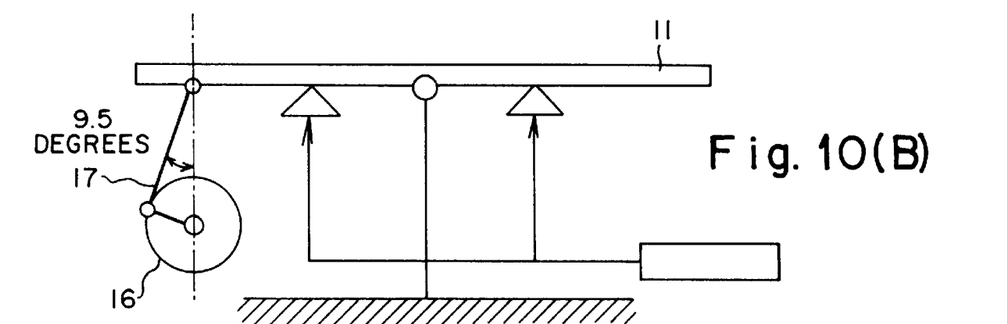
Figure 10C:
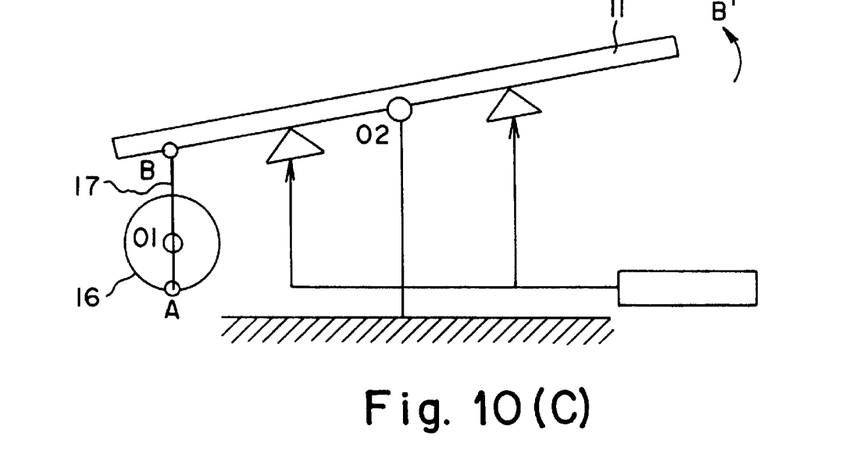

FIGS. 10(A)–(C) are typical side views each showing a crank mechanism.

FIGS. 10(A)–(C) show the state in which the scan mirror 11 rotatively moves in the arrow B direction to the maximum extend, the state in which the scan mirror 11 stays the middle position, and the scan mirror 11 rotatively moves in the arrow B' direction to the maximum extent, respectively.

As shown in FIG. 10(A), it is assumed that a distance between a rotation drive center 01 of the crank mechanism and a coupling point A with the coupling link 17 is denoted by r; and a distance between a coupling point B of the coupling link 17 with the scan mirror 11 and a rotary center 02 of the scan mirror 11 is denoted by R. The crank mechanism 16 and the scan mirror 11 are arranged in a positional relation in such a manner that when the rotation drive center 01, the coupling point A and the coupling point B are in line, the scan mirror 11 is involved in the extremal value of the rotation limit.

(Necessary resolution of the rotary drive section)

Since the target scan angle of the scan limit is given by ±5.2 degrees, the following relation exists between r and R.

$$\sin^{-1}(r/R) \geq 5.2 \text{ [deg]}$$

Here, since the value of R is given by 150 mm, $$r \geq R \sin(5.2) = 13.6 \text{ mm}$$

where r=14 mm

As shown in FIG. 10(B), with respect to the rotative movement position of the scan mirror 11, when the scan mirror 11 is in the horizontal position, an amount of the rotative movement of the scan mirror 11 per unit rotational quantity of the drive motor for the crank mechanism 16 is maximum. When the scan mirror 11, which is in the horizontal position, rotatively moves by 70 μrads (a target control resolution), the coupling link 17 lowers the coupling point B by $$\Delta t = 150 \sin(70 \times 10^{-6}) = 0.01 \text{ mm}.$$

Providing that Δt is reflected on the coupling point A as it is, a rotational quantity of the crank mechanism 16, which is necessary to rotatively move the scan mirror 11 in the state that the target control resolution is maintained, is expressed by $$\theta 2 = \sin^{-1}(0.01/14) = 700 \text{ [μrad]}$$

Now providing that as the drive motor, a stepping motor having a basic step angle 0.45 degrees is used to drive the crank mechanism through reducing speed by a harmonic drive gear of a reduction rate 100, the drive resolution of the crank is expressed by $$(0.45/100)(\pi/180) = 79 \text{ μrad}.$$

When this is converted into the rotational angle of the scan mirror 11, it is 7.4 μrads. This makes it possible to sufficiently implement the target control resolution.

(Scan limit)

From the length r=14 mm of the arm of the crank mechanism 16, and the distance L=150 mm between the center OS2 of the scan mirror and the coupling point B with the coupling link 17, the angle of the scan is expressed by $$\sin^{-1}(14/150) = 5.4 \text{ [deg]}.$$

This satisfies the target scan angle.

(Necessary torque of the drive motor)

Figure 11:
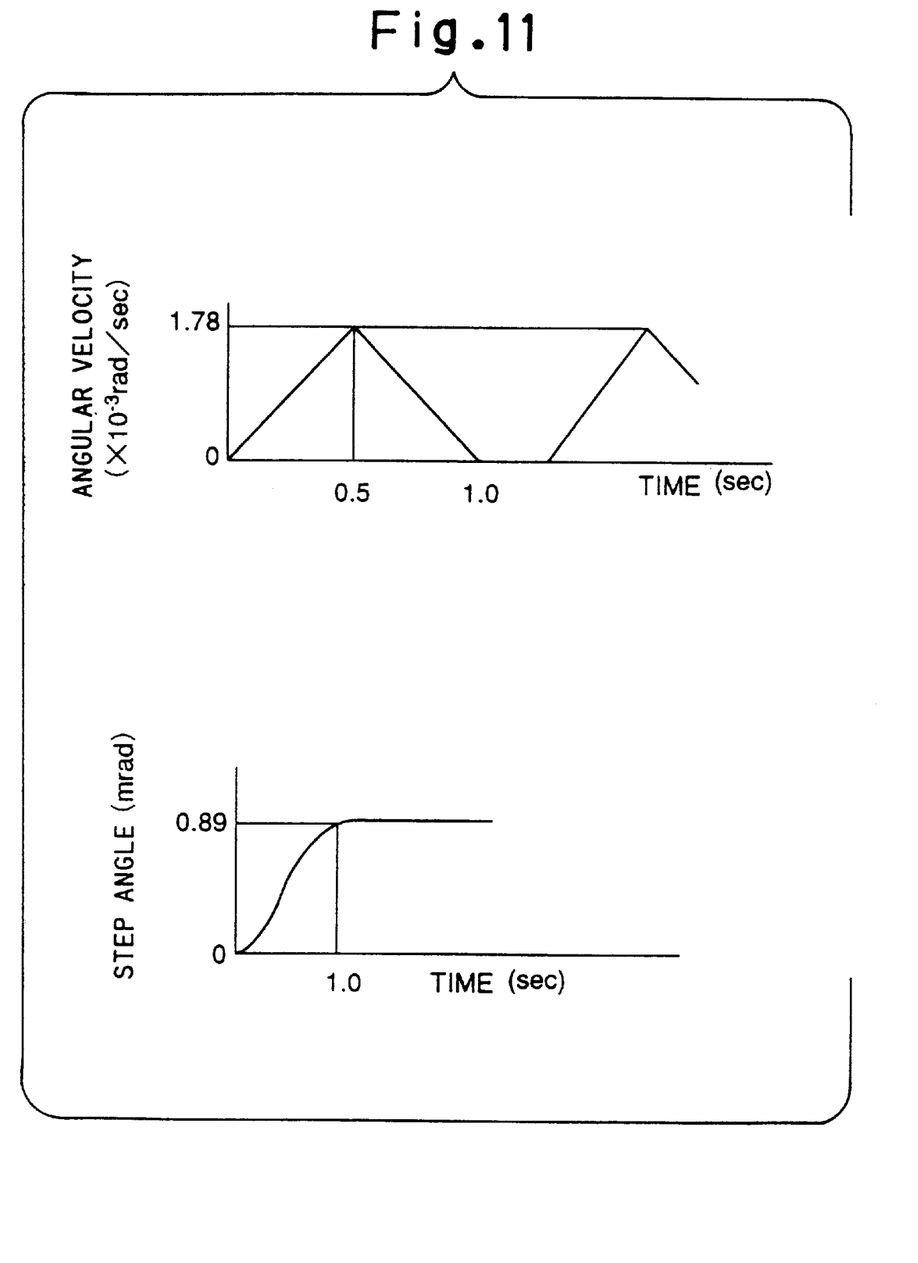
FIG. 11 is a diagram of drive velocity patterns when a drive motor drives a scan mirror.

FIG. 11 is a diagram of drive velocity patterns when a drive motor drives a scan mirror.

Since the target drive velocity is to move to the adjacent scene (0.89 [mrad]) within 1 second, the drive velocity patterns are given by FIG. 11. Hence, Drive angular velocity ω: 1.78 [mrad/s] or above Drive angular acceleration: 3.56 [mrad/s²] or above On the other hand, the rotational inertia $I_s$ is expressed by $$I_s = (R^2/4) M$$

where R denotes length of the ellipse of the scan mirror, and M denotes mass of the ellipse of the scan mirror.

In substitution of R=0.31 [m], and M=7 [kg], $$I_s = 0.17 \text{ [kgm}^2\text{]}$$

On the other hand, the rotational inertia $I_c$ of the corner cubes is expressed by $$I_c = 0.0056 \text{ [kgm}^2\text{]}$$

assuming that mass per a piece of corner cube is 0.25 [kg], and radius for mounting is 0.15 [m]. Hence, the total rotational inertia I of the scan mirror in its entirety is expressed by $I = I_s + I_c = 0.1756 \, [\text{kgm}^2]$ Further, in order to get rid of the looseness on the bearing of the scan mirror, it is assumed that the portion located apart from the center of the scan mirror by 0.15 [m] is pulled with a spring. Providing that a spring constant of the spring is 1.4 [kg/m], and the maximum amount of expansion is 0.0251 [m], the generated torque by the spring is 0.0516 [Nm].

Providing that parameters are expressed as follows, $T_m$: motor torque
$\eta_1$: efficiency of a reduction gear
$\eta_2$: efficiency of a mechanical system
$T_o$: starting torque of the reduction gear
$T_s$: torque generated by a spring
G: reduction gear ratio the motor torque needs to satisfy the following expression.

$$T_m \geq \{(I\omega + T_s)/(G\eta_1\eta_2)\} + T_o$$

Substitute the following values for the parameters.
G=100
$\eta_1 = 0.6$
$\eta_2 = 0.6$
$T_o = 0.03 \, [\text{Nm}]$
$T_s = 0.0516 \, [\text{Nm}]$
$\omega = 3.56 \times 10^{-3} \, [\text{rad/s}^2]$ Then, $T_m$ must satisfy the following expression.

$$T_m \geq 2.6 \times 10^{-2} \, [\text{Nm}]$$

Thus, it is effective to select a motor which generates a torque of $2.6 \times 10^{-2}$ [Nm] or more.

(Joint section)

In order to contribute to a weight saving as compared with the scan mirror scanner according to the earlier development as shown in FIG. 12, the universal joint is used to adopt a mechanism in which the scan mirror 11 is held at one point of the center. Further, there is used the universal joint also on the coupling section of the coupling link 17 of the crank mechanism 16 for driving the scan mirror 11 with the scan mirror 11.

What receives a load of the mirror is the central universal joint 14 (cf. FIG. 2), and the universal universal joint 18, which is used for coupling the drive link 17 with the scan mirror 11, does not almost receive a load. There is a need to design the central universal joint 14 in such a manner that when the scan mirror 11 receives 25G static load, which is the converted load when an artificial satellite loading thereon the scan mirror scanner is launched, the central universal joint 14 can be proof against such a load. Providing that the central universal joint 14 uses four bearings, the load per a piece of bearing is expressed by $$Ld = \{(8 \times 9.8 \times 25)/4\} = 490 \, [\text{N}]$$

where it is assumed that the total weight of the scan mirror and the corner cubes 46 and 47 is 8 kg. It is possible, as the bearing capable of proof against this load, to use, for example, a ball bearing having an inner diameter of 8 mm, and a basic static load rating and a basic dynamic load rating of of 715 [N] and 1610 [N], respectively. It is preferable, however, in the event that the solid lubricant or the like is applied for a space application, that a bearing more excellent in withstand load is adopted.

While the above-mentioned scan mirror scanner has two rotation axes 21A and 21B, which are perpendicularly intersect to one another, and performs a scan on a two-dimensional basis, it is to be noted that the respective rotary mechanisms for causing the scan mirror 11 to rotatively move on the rotation axes 21A and 21B are independent of one another, and also that the respective angle detection mechanisms for detecting angles of rotation on the rotation axes 21A and 21B are also independent of one another. Therefore, it will be understood that the scanner according to the present embodiment can easily applicable to a one-dimensional type of scanner having a single rotary mechanism and a single angle detection mechanism, in which a scan mirror rotatively moves on a single rotation axis.

In case of the one-dimensional type of scanner, there is no need to consider a two-dimensional rotative movement. Thus, it is acceptable that a reflection optical member, comprising two mirrors which are arranged to perpendicularly intersect one another, is adopted instead of the corner tubes.

Further, according to the scan mirror scanner of the present embodiment, the scan mirror is rotatively moved to scan the scan subject (e.g. the earth). However, it is acceptable that a camera fixing block or the like, in which a camera is directly set up instead of the scan mirror 11, is adopted as the rotatably movable member referred to in the present invention.

As described above, according to the present invention, it is possible to perform a high resolution of rotary angle detection on rotating limits of the rotatably movable member.

Further, according to the present invention, it is possible to contribute to weight saving of the scanner in its entirety.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A scanner comprising:

a rotatably movable member for rotatably moving on a predetermined rotation axis;

a rotary mechanism for causing said rotatably movable member to rotatably move on the rotation axis; and angle detection means for detecting a rotation angle of said rotatably movable member on the rotation axis, said angle detection means comprising an interference optical system for generating an interference light, and a light receiver for receiving the interference light generated by said interference optical system, wherein said interference optical system comprises a light source for emitting a coherent light, and two reflection optical members fixed to said rotatably movable member in such a manner that said two reflection optical members are arranged in a direction intersecting a direction of the rotation axis so as to be placed in alignment at a regular interval, each of said reflection optical members reflecting an incident light and emitting a reflected light toward an opposite direction to an incident direction of the incident light independently of a rotary position of said rotatably movable member, and said interference optical system divides the coherent light emanated from said light source into two parts to be introduced to the respective said two reflection optical members, and superposes coherent lights reflected from said two reflection optical members on each other, by generating the interference light caused by the coherent lights, and wherein each of said reflection optical members includes three mutually perpendicular intersecting reflecting surfaces; and wherein a distance of each said reflective optical member from said light source varies in accordance with a rotation of said rotatably movable member.

2. A scanner according to claim 1, wherein said light receiver comprises two light receiving elements arranged in a direction in which interference fringes of the interference light on a light receiving surface of said light receiver spatially move in accordance with a rotative movement of said rotatably movable member on the rotation axis, said two light receiving elements being arranged at intervals not an integer number as pitches ot the interference fringes.

3. A scanner according to claim 1, wherein said rotary mechanism comprises:

a motor for generating power to rotatively move said rotatably movable member; and a crank mechanism for converting a rotary motion of said motor into a reciprocating motion to transmit the power of said motor to said rotatably movable member.

4. A scanner comprising:

a rotatably movable member for rotatably moving on first and second axes mutually intersecting;

first and second rotary mechanisms for causing said rotatably movable member to rotatably move on the first and second rotation axes, respectively;

first angle detection means for detecting a rotation angle of said rotatably movable member on the first rotation axis, said first angle detection means comprising a first interference optical system for generating a first interference light, and a first light receiver for receiving the first interference light generated by said first interference optical system, wherein said first interference optical system comprises a first light source for emitting a coherent light, and two first reflection optical members fixed to said rotatably movable member in such a manner that said two first reflection optical members are arranged in a direction of the second rotation axis so as to be placed in alignment at a regular interval, each of said first reflection optical members reflecting an incident light and emitting a reflected light toward an opposite direction to an incident direction of the incident light independently of a rotary position of said rotatably movable member, and said first interference optical system divides the coherent light emanated from said first light source into two parts to be introduced to the respective said two first reflection optical members, and superposes coherent lights reflected from said two first reflection optical members on each other, thereby generating the first interference light caused by the coherent lights; and second angle detection means for detecting a rotation angle of said rotatably movable member on the second rotation axis, said second angle detection means comprising a second interference optical system for generating a second interference light, and a second light receiver for receiving the second interference light generated by said second interference optical system, wherein said second interference optical system comprises a second light source for emitting a coherent light, said second light source being for common use with said first light source, or being provided independently, and two second reflection optical members fixed to said rotatably movable member in such a manner that said two second reflection optical members are arranged in a direction of the first rotation axis so as to be placed in alignment at a regular interval, each of said second reflection optical members reflecting an incident light and emitting a reflected light toward an opposite direction to an incident direction of the incident light independently of a rotary position of said rotatably movable member, and said second interference optical system divides the coherent light emanated from said second light source into two parts to be introduced to the respective said two second reflection optical members, and superposes coherent lights reflected from said two second reflection optical members on each other, thereby generating the second interference light caused by the coherent lights, wherein each of said first and second reflection optical members includes three mutually perpendicular intersecting reflecting surfaces, and wherein a distance of each said first reflection optical member and each said second reflection optical member from said light source varies in accordance with a rotation of said rotatably moving member.

5. A scanner according to claim 4, wherein said first light receiver comprises two first light receiving elements arranged in a direction in which interference fringes of the first interference light on a light receiving surface of said first light receiver spatially move in accordance with a rotative movement of said rotatably movable member on the rotation axis, said two first light receiving elements being arranged at intervals different from pitches of the interference fringes, and wherein said second light receiver comprises two second light receiving elements arranged in a direction in which interference fringes of the second interference light on a light receiving surface of said second light receiver spatially move in accordance with a rotative movement of said rotatably movable member on the rotation axis, said two second light receiving elements being arranged at intervals different from pitches of the interference fringes.

6. A scanner according to claim 4, wherein said first rotary mechanism comprises:

a first motor for generating power to rotatively move said rotatably movable member; and a first crank mechanism for converting a rotary motion of said first motor into a reciprocating motion to transmit the power of said first motor to said rotatably movable member, and wherein said second rotary mechanism comprises:

a second motor for generating power to rotatively move said rotatably movable member; and a second crank mechanism for converting a rotary motion of said second motor into a reciprocating motion to transmit the power of said second motor to said rotatably movable member.

7. A scanner according to claim 4, wherein said two first reflection optical members are located on the second rotation axis and at places given by oppositely equal distances with respect to the first rotation axis, respectively, and wherein said two second reflection optical members are located on the first rotation axis and at places given by oppositely equal distances with respect to the second rotation axis, respectively.

* * * * *